United States Patent [19]

Markusch et al.

[11] Patent Number: 5,191,012

[45] Date of Patent: Mar. 2, 1993

[54] AQUEOUS DISPERSIONS OF ENCAPSULATED POLYISOCYANATES

[75] Inventors: Peter H. Markusch, McMurray, Pa.; Ashok M. Sarpeshkar, New Martinsville; Robin E. Tirpak, Wheeling, both of W. Va.

[73] Assignee: Miles Inc., Pittsburgh, Pa.

[21] Appl. No.: 677,010

[22] Filed: Mar. 28, 1991

[51] Int. Cl.$^5$ .............................. C08J 3/02; C08K 3/20; C08L 75/00; C08G 18/00

[52] U.S. Cl. .................................. 524/591; 524/874; 528/44; 528/60; 528/61

[58] Field of Search ................... 524/591, 874; 528/60, 528/61, 44

[56] References Cited

U.S. PATENT DOCUMENTS

| | | | |
|---|---|---|---|
| 3,663,472 | 5/1972 | Raymond | 524/591 |
| 3,959,329 | 5/1976 | Dieterich et al. | 260/453 AR |
| 3,959,348 | 5/1976 | Reiff et al. | 260/471 C |
| 4,052,347 | 10/1977 | Dieterich et al. | 260/2.5 AK |
| 4,097,422 | 6/1978 | Markusch | 260/2.5 AK |
| 4,098,933 | 7/1978 | Burkhardt et al. | 427/379 |
| 4,142,030 | 2/1979 | Dieterich et al. | 521/100 |
| 4,144,267 | 3/1979 | Dieterich et al. | 260/505 R |
| 4,176,118 | 11/1979 | Petinaux et al. | 260/239 A |
| 4,203,883 | 5/1980 | Hangauer, Jr. | 260/29.2 TN |
| 4,284,544 | 8/1981 | Wegner et al. | 260/29.2 TN |
| 4,408,008 | 10/1983 | Markusch | 524/591 |
| 4,522,851 | 6/1985 | Rosthauser | 427/386 |
| 4,663,377 | 5/1987 | Hombach et al. | 524/196 |
| 4,745,151 | 5/1988 | Noll et al. | 524/591 |
| 4,904,522 | 2/1990 | Markusch | 428/288 |

FOREIGN PATENT DOCUMENTS

1186771  4/1970  United Kingdom .

Primary Examiner—Paul R. Michl
Assistant Examiner—Patrick Niland
Attorney, Agent, or Firm—Joseph C. Gil; Thomas W. Roy

[57] ABSTRACT

The present invention is directed to an aqueous dispersion of an encapsulated polyisocyanate which contains ureacted isocyanate groups and is prepared by a) dispersing in water a polyisocyanate which has an isocyanate content of at least 12% by weight and b) reacting the dispersed polyisocyanate with a polyamine having primary and/or secondary amino groups and a molecular weight of 400 or less in an amount sufficient to provide an equivalent ratio of amino groups to isocyanate groups of at least 0.05:1.0.

The present invention is also directed to aqueous compositions containing the previously described encapsulated polyisocyanate and an isocyanate-reactive compound.

8 Claims, No Drawings

AQUEOUS DISPERSIONS OF ENCAPSULATED POLYISOCYANATES

BACKGROUND OF THE INVENTION

1. Field of the Invention

The present invention is directed to aqueous dispersions of encapsulated polyisocyanates which have improved pot life and to their use in compositions containing waterborne isocyanate-reactive compounds.

2. Description of the Prior Art

Water dispersible polyisocyanates and processes for achieving water dispersibility of hydrophobic polyisocyanates through chemical modification are known and disclosed in, e.g., U.S. Pat. Nos. 4,176,118, 4,144,267, 4,142,030, 4,097,422, 4,052,347, 3,959,348 and 3,959,329. It is also known to use hydrophobic polyisocyanates in combination with aqueous solutions or suspensions as disclosed in U.S. Pat. Nos. 4,105,594 and 4,129,696. Further, it is known from British Patent 1,186,771 to use external surfactants or additives which are not reactive with isocyanate groups to achieve dispersibility of these hydrophobic isocyanates in water. Aqueous dispersions of hydrophobic polyisocyanates can also be generated in the absence of surfactants or additives using mechanical devices which provide high shear forces.

U.S. Pat. No. 4,904,522 is directed to the preparation of water dispersible polyisocyanates for use in fiberglass binder applications. In addition, U.S. Pat. No. 4,663,377 is directed to the use of water dispersible polyisocyanates in adhesive applications.

The disadvantage of all of these products is that after they are dispersed in aqueous media, they begin to react with water, which means these products have a limited potlife. Waiting too long to apply the product usually results in precipitation and/or formation of insoluble, non-film forming ureas. Even when these products are applied directly after the aqueous dispersions are formed, there is a problem. If film formation occurs before the water/isocyanate reaction is complete, subsequent carbon dioxide formation will result in bubbles in the film rendering it useless for coatings applications. Although undesirable, porous films may still be acceptable as binders for adhesive applications when large surface areas are formed and the resulting polyurethane/urea acts as a spot-type glue between, e.g., fibers, the carbon dioxide gas formation has no negative impact on performance.

One solution for this problem that will lead to non-porous films is to block the isocyanate groups of the water dispersible isocyanate prior to dispersing it in water as described in U.S. Pat. Nos. 4,522,851, 4,098,933 and 4,284,544. The disadvantage of the blocked isocyanate groups is that they require elevated temperatures (above 100° C.) to achieve deblocking and cure and cannot be used as crosslinkers for aqueous systems at room temperature.

Accordingly, an object of the present invention is to provide aqueous polyisocyanate dispersions which have improved pot lives, may be cured at room temperature and exhibit film forming properties.

Surprisingly, this object may be achieved in accordance with the present invention by reacting the dispersed polyisocyanates with polyamines in order to encapsulate them.

SUMMARY OF THE INVENTION

The present invention is directed to an aqueous dispersion of an encapsulated polyisocyanate which contains unreacted isocyanate groups and is prepared by a) dispersing in water a polyisocyanate which has an isocyanate content of at least 12% by weight and b) reacting the dispersed polyisocyanate with a primary and/or secondary polyamine in an amount sufficient to provide an equivalent ratio of amino groups to isocyanate groups of at least 0.05:1.0.

The present invention is also directed to aqueous compositions containing the previously described encapsulated polyisocyanate and an isocyanate-reactive compound.

DETAILED DESCRIPTION OF THE INVENTION

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water even if they are hydrophilically modified.

Examples of suitable monomeric polyisocyanates include 1,6-hexamethylene diisocyanate, 1,12-dodecane diisocyanate, cyclo-butane-1,3-diisocyanate, cyclohexane-1,3 and/or -1,4-diisocyanate, 1-isocyanato-3,3,5-trimethyl-5-isocyanatomethyl cyclohexane (isophorone diisocyanate), 2,4- and/or 2,6-hexahydrotoluylene diisocyanate, hexahydro-1,3- and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenylmethane-2,4'- and/or -4,4'-diisocyanate, naphthalene-1,5-diisocyanate, triphenylmethane-4,4',4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, urethane groups or biuret groups, especially those based on 2,4- and/or 2,6-toluylene diisocyanate ("TDI"), 1,6- hexamethylene diisocyanate, isophorone diisocyanate and mixtures thereof.

The polyisocyanates or polyisocyanate adducts used to prepare the aqueous dispersions of the present invention may be used in their unmodified, hydrophobic form or they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae

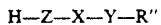

or

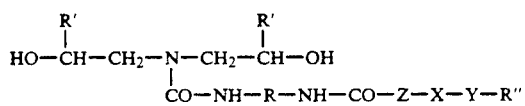

wherein
R represents a difunctional radical obtained by removing the isocyanate groups from a diisocyanate corresponding to those previously set forth,
R' represents hydrogen or a monovalent hydrocarbon radical containing from 1 to 8 carbon atoms, preferably hydrogen or a methyl group,
R" represents a monovalent hydrocarbon radical having from 1 to 12 carbon atoms, preferably an unsubstituted alkyl radical having from 1 to 4 carbon atoms,
X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units,
Y represents oxygen or —NR'" wherein R'" has the same definition as R" and
Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference).

The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2. Accordingly, the functionality of the component containing hydrophilic groups and the functionality of the polyisocyanate must be taken into consideration in order to ensure that the modified polyisocyanates have functionalities of at least 2.

The polyisocyanate dispersions generally have a solids content of about 2 to 50, preferably about 10 to 30 weight percent.

After the polyisocyanates have been dispersed in water, they are reacted with polyamines having a molecular weight of less than about 400 and containing two or more primary and/or secondary amino groups. The amino groups may be aliphatically-, cycloaliphatically-, araliphatically- or aromatically-bound. Examples of suitable polyamines include ethylene diamine, 1,3-propane diamine, 1,4-butane diamine, 2-methyl-pentamethylene diamine, N,N'-dimethyl-ethylene diamine, diethylene triamine, triethylene tetraamine, tetraethylene pentamine, pentaethylene hexamine, 1,6-hexane diamine, piperazine, 2,5-dimethyl piperazine, 1-amino-3-aminomethyl-3,5,5-trimethylcyclohexane (isophorone diamine), bis-(4-aminocyclohexyl)-methane, bis-(4-amino-3-methylcyclohexyl)-methane, 1,2- and 1,4-cyclohexane diamine, 1,2-propane diamine, hydrazine, aminoacid hydrazides, hydrazides of semicarbazido carboxylic acids, bis-hydrazides, bis-semicarbazides, N,N,N-tris-(2-aminoethyl)-amine, N-(2-piperazinoethyl) ethylene diamine, N,N'-bis-(2-aminoethyl)-piperazine, N,N,N'-tris-(2-aminoethyl)-ethylene diamine, N-[N-(2-aminoethyl)-2-amino-ethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobis-propylamine, guanidine, melamine, N-(2-aminoethyl)-1,3-propane diamine, 3,3'-diaminobenzidine, 2,4,6-triaminopyrimidine, polyoxypropylene amines, tetrapropylene pentamine, tripropylene tetramine, N,N-bis-(6-aminohexyl)-amine, N,N'-bis-(3-aminopropyl)-ethylene diamine, 2,4-bis-(4'-aminobenzyl)-aniline, diethyl-toluene diamine isomers, toluene diamine isomers, 1,3-phenylene diamine, methylene-bis-(phenylamine) isomers, 1,5-naphthalene diamine, aniline, alkyl anilines, toluidine, t-butyl-toluene diamine isomers, methylene-bis-(o-dichloroaniline) (MOCA), 2,4-diaminoalkylbenzene isomers having 8 to 15 carbon atoms in the alkyl chain and mixtures of these polyamines.

Preferred polyamines include ethylene diamine, 1,3-propane diamine, 1,4-butane diamine, 2-methyl-pentamethylene diamine, N,N'-dimethyl-ethylene diamine, diethylene triamine, piperazine, 1-amino-3-aminomethyl-3,5,5-trimethylcyclohexane (isophorone diamine), bis-(4-aminocyclohexyl)methane, 1,2-propane diamine, hydrazine, diethyl-toluene diamine isomers, 1,3-phenylene diamine and mixtures thereof.

The polyamine may be added to the water either before, during or after the polyisocyanate has been dispersed. Preferably, the polyisocyanate is first dispersed in water and then the polyamine is added to the dispersed polyisocyanate. The amount of the polyamine is chosen to provide an equivalent ratio of amino groups to isocyanate groups of the polyisocyanate of at least 0.05:1, preferably 0.05:1.0 to 0.45:1.0 and more preferably 0.1:1.0 to 0.3:1.0.

It is believed that the amino groups react with the isocyanate groups on the surface of the dispersed polyisocyanates to form urea groups which encapsulate the dispersed polyisocyanates. Because many of the isocyanate groups are in the interior of the dispersed particles, it is not necessary nor preferred to add sufficient amine to react with all of the isocyanate groups. After the amino groups have reacted with the isocyanate groups on the surface, any excess polyamine remains present in admixture with the encapsulated polyisocyanates. The presence of the excess amines can be verified by an increase in the pH of the dispersion. During subsequent curing of the dispersions, any excess amine can react with the previously unreacted isocyanate groups.

The maximum amount of polyamine that can be reacted without having unreacted amine in the dispersion varies depending on the specific polyamine. For example, about 30% of the amino groups is the maximum for ethylene diamine, but for 2-methyl-pentamethylene diamine the maximum level is less.

After the reaction between the dispersed polyisocyanate and the polyamine is complete, the encapsulated polyisocyanate has an isocyanate content of 4 to 40% by weight, preferably 5 to 25% by weight and more preferably 10 to 20% by weight, based on the weight of the polyisocyanate.

In accordance with the present invention, it is also possible to incorporate additives into the aqueous dispersions of encapsulated polyisocyanates. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The aqueous dispersions of encapsulated polyisocyanates may be used alone, e.g., as binders for fiberglass, or they may be used as crosslinkers for aqueously dispersed polyurethanes which may optionally contain hydroxyl and/or amino groups. The dispersions according to the present invention are also suitable to improve the properties (such as adhesion, solvent resistance and abrasion resistance) of many other aqueous polymer dispersions such as acrylic, epoxy, polyvinyl acetate and styrene/butadiene rubber dispersions. Another feature of the aqueous dispersions of encapsulated polyisocyanates is that after the encapsulation is complete, water soluble or dispersible isocyanate co-reactants, e.g., glycols, glycerine, etc., can be added; these co-reactants can react with the polyisocyanates after evaporation of the water.

The invention is further illustrated but is not intended to be limited by the following examples in which all parts and percentages are by weight unless otherwise specified.

EXAMPLES

Example 1

Preparation of modified polyisocyanate

A four liter round bottom flask equipped with a thermometer, drying tube, condenser, and stirrer was charged with 1366 grams of Crude MDI[1] and 683 grams of a monofunctional poly(ethylene oxide) ether[2]. The temperature of the reaction flask was increased to 80° C. The reaction proceeded at this temperature for four hours at which time the isocyanate content was determined by titration to be 20.48% (theoretical NCO=20.68%). The prepolymer was cooled to ambient temperature and placed in dry bottles for latter use.

1 An aniline/formaldehyde condensation product containing 4,4'-diphenylmethane diisocyanate and about 50% of higher functionality homologs and having an isocyanate content of about 31.5% and a viscosity at 25° C. of 200 mPa.s.
2 A polyether monohydric alcohol having a molecular weight of 2200 and prepared from n-butanol, ethylene oxide and propylene oxide (molar ratio of ethylene oxide to propylene oxide molar ratio—83:17).

Example 2

Preparation of aqueous polyisocyanate dispersion (comparison)

A two liter resin flask was charged with 822 grams of demineralized water at ambient temperature. While rapidly stirring the water, 200 grams of the prepolymer from Example 1 was added in about four minutes to the flask. The off-white polyisocyanate dispersion was stirred and sampled intermittently for isocyanate content. After stirring for one hour, 63% of the isocyanate groups remained. After three hours, 51% of the isocyanate groups remained. After 24 hours of the isocyanate groups remained. The pH of the dispersion was 7.

Example 3

Preparation—aqueous dispersion of encapsulated polyisocyanate

A two liter resin flask was charged with 630 grams of demineralized water at ambient temperature. While rapidly stirring the water, 153 grams of the prepolymer from Example 1 was added in about four minutes to the flask. Ethylene diamine (EDA, 4.5 grams) was added immediately following the dispersing step. This corresponded to an equivalent ratio of amino groups to isocyanate groups of 0.2:1.0. The off-white dispersion was stirred and sampled intermittently for isocyanate content. After one hour 80% of the isocyanate groups present after the reaction with EDA remained. After 3 hours, 79% of the isocyanate groups remained. After 24 hours, 51% of the isocyanate groups remained. The pH of the dispersion was 7.

Example 4

Preparation—aqueous dispersion of encapsulated polyisocyanate

A two liter resin flask was charged with 645 grams of demineralized water at ambient temperature. While rapidly stirring the water, 153 grams of the prepolymer from Example 1 was added in about four minutes to the flask. Ethylene diamine (EDA, 7.9 grams) was added immediately following the dispersing step. This corresponded to an equivalent ratio of amino groups to isocyanate groups of 0.35:1.0. The off-white dispersion was stirred and sampled intermittently for isocyanate content. After one hour 89% of the isocyanate groups present after the reaction with EDA remained. After three hours, 80% of the isocyanate groups remained. After 24 hours, 51% of the isocyanate groups remained. The pH of the dispersion was 8. The high pH indicates that unreacted amine remained in the water and that encapsulation of the prepolymer had taken place.

Example 5

Preparation—aqueous dispersion of encapsulated polyisocyanate

A two liter resin flask was charged with 400 grams of demineralized water at ambient temperature. While rapidly stirring the water, 100 grams of the prepolymer from Example 1 was added over a period of several minutes to the flask. A piperazine solution (5.2 g in 20.9 g of water) was added immediately following the dispersing step. This corresponded to an equivalent ratio of amino groups to isocyanate groups of 0.25:1.0. The off-white dispersion was stirred and sampled intermittently for isocyanate content. After one hour 92% of the isocyanate groups present after the reaction with piperazine remained. After three hours, 80% of the isocyanate groups remained. After 6 hours, 71% of the isocyanate groups remained. The pH of the dispersion was 7.

Example 6

Preparation—aqueous dispersion of encapsulated polyisocyanate

A two liter resin flask was charged with 400 grams of demineralized water at ambient temperature. While rapidly stirring the water, 100 grams of the prepolymer from Example 1 was added over a period of two to three minutes to the flask. A solution of 1,3-phenylene diamine (6.6 g in 26.2 g of water) was added immediately following the dispersing step. This corresponded to an equivalent ratio of amino groups to isocyanate groups of 0.25:1.0. The off-white dispersion was stirred and sampled intermittently for isocyanate content. After one hour 97% of the isocyanate present after the reaction with phenylene diamine remained. After four hours, 89% of the isocyanate groups remained. After 6 hours, 86% of the isocyanate groups remained. The pH of the dispersion was 6.

Example 7

Preparation—aqueous dispersion of encapsulated polyisocyanate

A two liter resin flask was charged with 400 grams of demineralized water at ambient temperature. While rapidly stirring the water, 100 grams of the prepolymer from Example 1 was added over a period of two to three minutes to the flask. A solution of N,N'-dimethyl-ethylene diamine (5.3 g in 21.4 g of water) was added immediately following the dispersing step. This corresponded to an equivalent ratio of amino groups to isocyanate groups of 0.25:1.0. The off-white dispersion was stirred and sampled intermittently for isocyanate content. After one hour 82% of the isocyanate present after the reaction with N,N'-dimethyl-ethylene diamine remained. After four hours, 69% of the isocyanate groups remained. After 6 hours, 65% of the isocyanate groups remained. The pH of the dispersion was 5.

Example 8

Preparation—aqueous dispersion of encapsulated polyisocyanate

A two liter resin flask was charged with 400 grams of demineralized water at ambient temperature. While rapidly stirring the water, 100 grams of the prepolymer from Example 1 was added over a period of two to three minutes to the flask. A solution of diethylenetriamine (4.1 g in 16.5 g of water) was added immediately following the dispersing step. This corresponded to an equivalent ratio of amino groups to isocyanate groups of 0.25:1.0. The off-white dispersion was stirred and sampled intermittently for isocyanate content. After one hour 77% of the isocyanate groups present after the reaction with diethylenetriamine remained. After four hours, 66% of the isocyanate groups remained. After 6 hours, 63 of the isocyanate groups remained. The pH of the dispersion was 6.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. An aqueous dispersion of an encapsulated polyisocyanate which contains unreacted isocyanate groups and is prepared by a process which comprises
   a) dispersing in water a polyisocyanate which has an isocyanate content of at least 12% by weight and
   b) reacting the dispersed polyisocyanate with a polyamine having primary and/or secondary amino groups and having a molecular weight of 400 or less in an amount sufficient to provide an equivalent ratio of amino groups to isocyanate groups of at least 0.05:1.0.

2. The aqueous dispersion of claim 1 wherein said dispersed polyisocyanate was rendered hydrophilic by reaction with a compound containing a lateral or terminal nonionic hydrophilic group.

3. The aqueous dispersion of claim 1 wherein said equivalent ratio of amino groups to isocyanate groups is 0.05:1.0 to 0.45:1.0.

4. The aqueous dispersion of claim 2 wherein said equivalent ratio of amino groups to isocyanate groups is 0.05:1.0 to 0.45:1.0.

5. An aqueous composition which comprises a component which is reactive with isocyanate groups and an aqueous dispersion of an encapsulated polyisocyanate which contains unreacted isocyanate groups and is prepared by a process which comprises
   a) dispersing in water a polyisocyanate which has an isocyanate content of at least 12% by weight and
   b) reacting the dispersed polyisocyanate with a polyamine having primary and/or secondary amino groups and having a molecular weight of 400 or less in an amount sufficient to provide an equivalent ratio of amino groups to isocyanate groups of at least 0.05:1.0.

6. The aqueous dispersion of claim 5 wherein said dispersed polyisocyanate was rendered hydrophilic by reaction with a compound containing a lateral or terminal nonionic hydrophilic group.

7. The aqueous dispersion of claim 5 wherein said equivalent ratio of amino groups to isocyanate groups is 0.05:1.0 to 0.45:1.0.

8. The aqueous dispersion of claim 6 wherein said equivalent ratio of amino groups to isocyanate groups is 0.05:1.0 to 0.45:1.0.

* * * * *